(12) United States Patent
Field et al.

(10) Patent No.: US 6,195,486 B1
(45) Date of Patent: Feb. 27, 2001

(54) FIBER OPTIC CABLE HAVING A COMPONENT WITH AN ABSORPTIVE POLYMER COATING AND A METHOD OF MAKING THE CABLE

(75) Inventors: Larry W. Field; Naren I. Patel, both of Hickory, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,201

(22) Filed: Jun. 2, 1998

(51) Int. Cl.[7] .................................................... G02B 6/44
(52) U.S. Cl. ............................ 385/100; 385/103; 385/107
(58) Field of Search ................................... 385/100, 103, 385/107

(56) References Cited

U.S. PATENT DOCUMENTS

| | | | |
|---|---|---|---|
| 3,785,048 | 1/1974 | Petersen | 29/624 |
| 4,151,365 | 4/1979 | Hacker | 174/107 |
| 4,308,662 | 1/1982 | Bohannon, Jr. | 29/828 |
| 4,322,574 | 3/1982 | Bow et al. | 174/107 |
| 4,449,014 | 5/1984 | Brezinsky | 174/107 |
| 4,535,098 | 8/1985 | Evani et al. | 521/149 |
| 4,767,894 | 8/1988 | Schombourg | 174/106 |
| 4,857,242 | 8/1989 | Hoffmann et al. | 264/1.4 |
| 5,188,883 | 2/1993 | Rawlyk | 428/189 |
| 5,388,175 | 2/1995 | Clarke | 385/100 |
| 5,408,562 | * 4/1995 | Yoshizawa | 385/112 |
| 5,410,901 | 5/1995 | Robblee et al. | 72/176 |
| 5,684,904 | 11/1997 | Bringuier et al. | 385/109 |
| 5,689,601 | 11/1997 | Hager et al. | 385/100 |
| 5,913,004 | * 6/1999 | Takase | 385/123 |
| 5,930,431 | * 7/1999 | Lail | 385/100 |
| 5,999,676 | * 12/1999 | Hwang | 385/106 |

FOREIGN PATENT DOCUMENTS

| | | | |
|---|---|---|---|
| 0564993A1 | 10/1993 | (EP) | G02B/6/44 |
| 3-137607 | 6/1991 | (JP) | G02B/6/44 |

\* cited by examiner

Primary Examiner—Thong Nguyen
Assistant Examiner—Leo Boutsikaris
(74) Attorney, Agent, or Firm—Timothy J. Aberle

(57) ABSTRACT

A fiber optic cable (10) having at least one optical fiber (22) and a component disposed within the cable (10) between a core (20) and a jacket section (30) of the cable, and a method of making the cable. The component includes a substrate (34) with a water blocking formulation (50) thereon, the water blocking formulation (50) comprising a radiation curable resin (52) and a water absorptive substance (54) at least partially embedded or compounded in the radiation curable resin (52). The radiation curable resin (52) includes an initiator for rapid processing speeds. The water blocking formulation (50) may include a non-compatible material for reducing friction and/or enhancing physical properties. Water blocking formulation (50) is advantageously adaptable to application on various exemplary cable components (40,75,87,94,96,98,104).

37 Claims, 3 Drawing Sheets

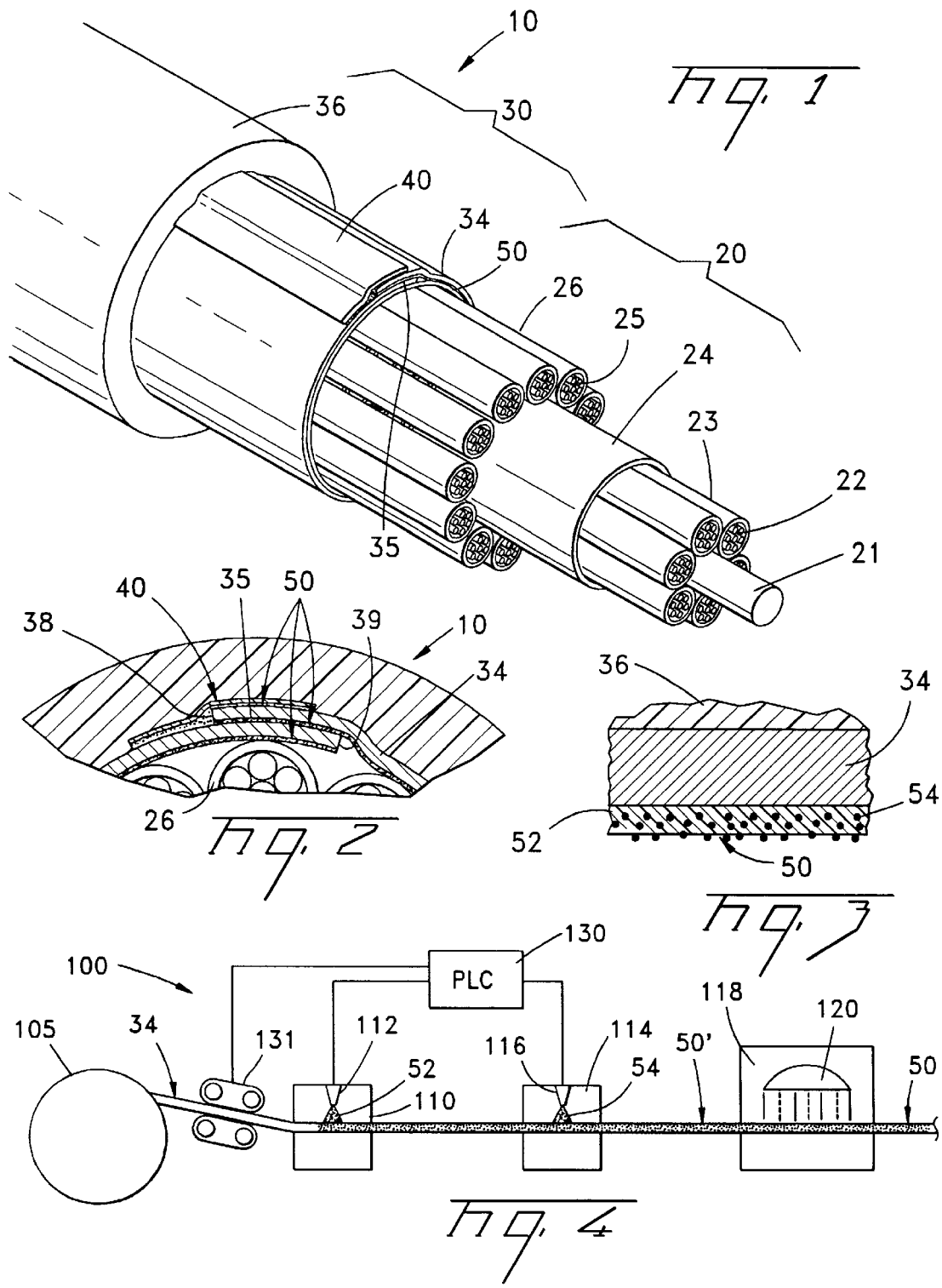

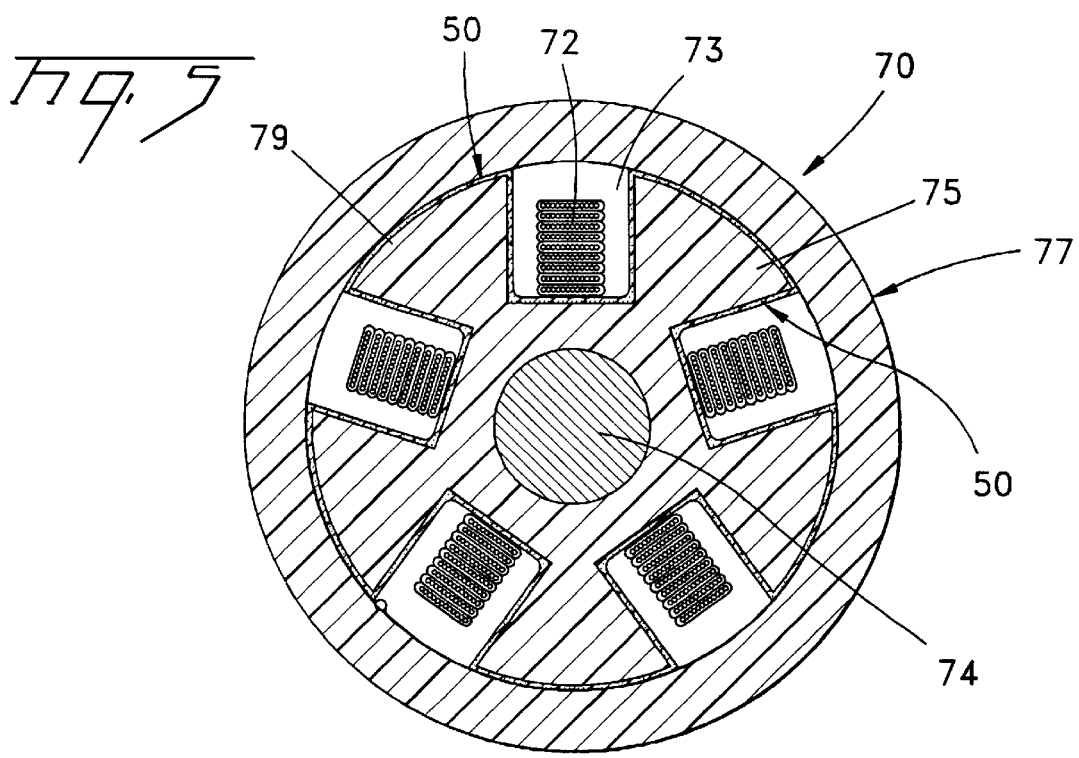
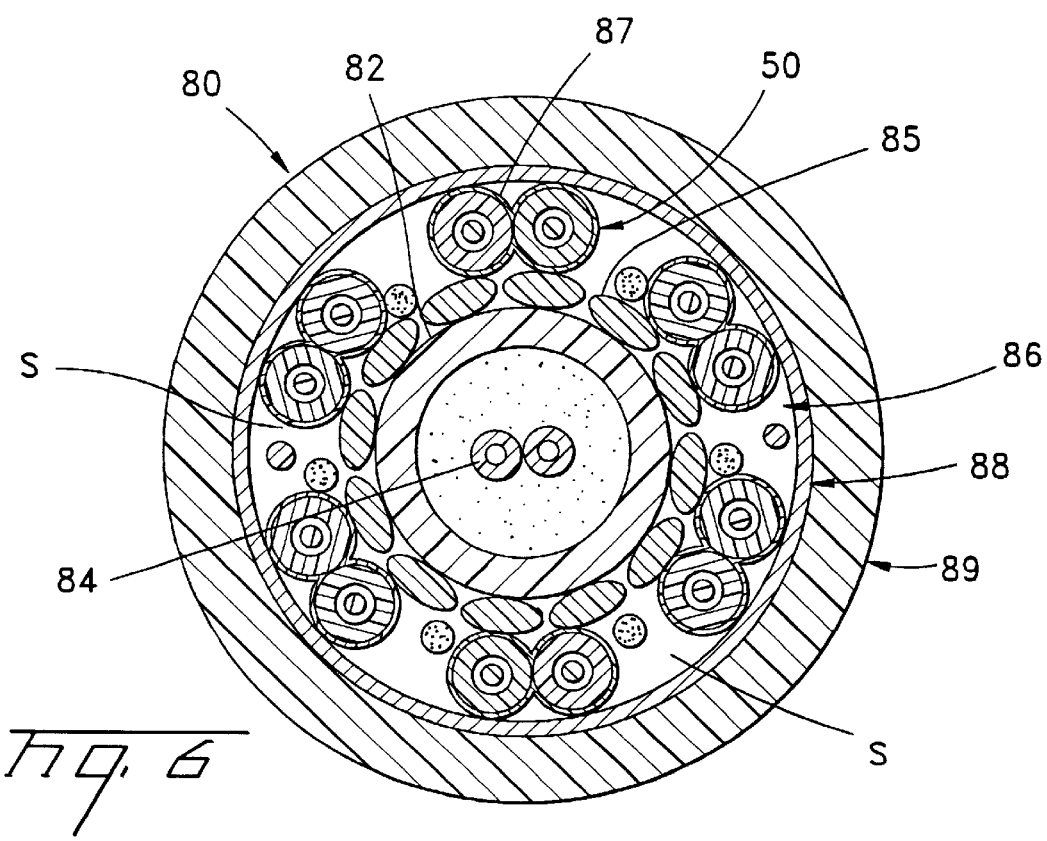

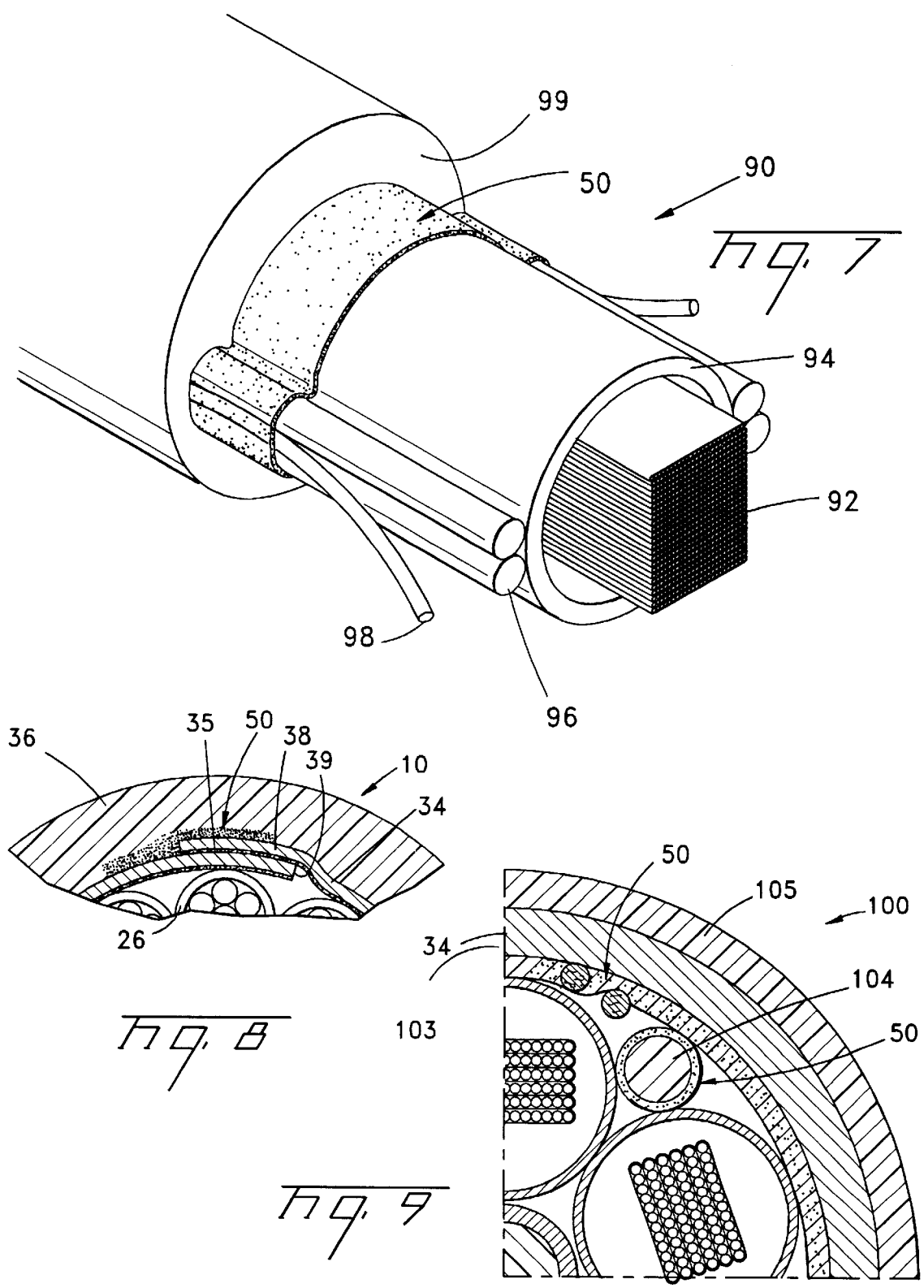

FIBER OPTIC CABLE HAVING A COMPONENT WITH AN ABSORPTIVE POLYMER COATING AND A METHOD OF MAKING THE CABLE

The present invention relates to fiber optic cables and, more particularly, to water blocking features of fiber optic cables.

Fiber optic cables include optical fibers which transmit information in cable television, computer, and telephone systems. A fiber optic cable may be installed in an environment where the cable is exposed to water. The migration of water in a fiber optic cable may occur where the cable jacket has been breached and water enters the cable. The migration of water in a cable may cause the flooding of a cable passageway or enclosure, and/or it may negatively affect the performance of the optical fibers. Interstices between a jacket section and the core of the cable present potential water migration paths.

To block the flow of water in the interstices, known fiber optic cables may include a flooding compound, and/or a more craft-friendly, dry water absorbent substance. A typical water absorbent substance includes a polymer chain with reaction sites that react with water, thereby transforming the water absorbent substance into an expanded mass of viscous gel. The viscous gel acts as a physical barrier to the migration of water.

U.S. Pat. No. 5,179,611 discloses a slotted rod type fiber optic cable that includes a water absorptive tape disposed between a jacket section and the slotted rod. The tape is a non-woven fabric, a paper or other sheet-like material, which is topically coated or impregnated with a combination of a thermoplastic elastomer binding agent and a water absorptive resin combined with a water soluble resin. Application of the water absorptive tape to the slotted rod requires manufacturing equipment that is expensive to purchase and to maintain. Additionally, the water absorptive tape is a cable component that adds to the cost, size, and weight of the cable. Further, a craftsman will be obliged to perform the time consuming task of cutting and removing tape binders and the water absorptive tape in order to gain access to optical fibers in the cable.

A patent assigned to the assignee hereof discloses a fiber optic cable which eliminates the necessity for a water absorptive tape. U.S. Pat. No. 5,188,883 discloses an armor tape having an ethylene copolymer coating to which a layer of a swellable water blocking material is bonded. In a first method of making the armor tape, the layers are bonded together by heating the ethylene copolymer to soften it and then pressing the metal and water blocking tape layers together. In an alternative method of making the armor tape, the swellable material is applied directly to and is bonded with the coated metal tape layer. This alternative method is accomplished by heating and thereby softening the ethylene copolymer, and then depositing particles of the water swellable material directly on the softened copolymer by way of gravity acting on the particles as they are dispensed from a hopper. The water swellable tape of the first method may be expensive, and the application of the tapes to a cable core requires expensive manufacturing equipment. The manufacturing steps associated with wrapping the tape about the core contributes to the cost of production of the cable, and the use of a heater to soften the ethylene copolymer may likewise slow production speeds and increase costs.

OBJECTS OF THE INVENTION

In view of the foregoing, it is an object of the present invention to provide a fiber optic cable that includes a at least one optical fiber, a cable jacket, and a cable component associated with the cable jacket, the cable component including a water blocking formulation disposed on a substrate, the water blocking formulation comprising a radiation curable resin and an absorptive substance at least partially embedded therein.

It is another object of the present invention to provide a fiber optic cable that includes a cable core including at least one optical fiber, a cable component associated with the cable core and at least partially surrounding the cable core, the cable component having a water blocking formulation disposed on a substrate, the water blocking formulation comprising a radiation curable resin and an absorptive substance therein.

It is an object of the present invention to provide a fiber optic cable that includes a least one optical fiber, a component disposed within the cable between a core and a jacket section of the cable, the component including a substrate with a composite water blocking formulation disposed thereon, the composite water blocking formulation comprising a radiation curable resin, an absorptive substance at least partially embedded in the radiation curable resin, and a non-compatible material dispersed in the radiation curable resin.

It is a further object of the present invention to provide a method of making a fiber optic cable with at least one optical fiber, the method having the steps of coating a substrate with a radiation curable resin, creating a water blocking formulation by depositing an absorptive substance on the resin so that the absorptive substance becomes at least partially embedded in the resin, irradiating the water blocking formulation with a radiation source that emits radiation in the infrared wavelength region or with radiation having shorter wavelengths, curing the water blocking formulation with the radiation-emitting radiation source, and incorporating the substrate and the water blocking formulation in the fiber optic cable.

It is an object of the present invention to provide a method of making a fiber optic cable including the steps of creating a water blocking formulation comprising a radiation curable resin and an absorptive substance compounded in the radiation curable resin, coating a substrate with the water blocking formulation so that the absorptive substance is at least partially embedded in the resin, irradiating the water blocking formulation with a radiation source that emits radiation in the infrared wavelength region or with radiation having shorter wavelengths, curing the water blocking formulation with the radiation-emitting radiation source, and incorporating the substrate and water blocking formulation in the fiber optic cable.

BRIEF DESCRIPTION OF THE DRAWING FIGURES

FIG. 1 is an isometric view of a fiber optic cable according to the present invention.

FIG. 2 is a partial cross sectional view of a portion of the fiber optic cable of FIG. 1.

FIG. 3 is a cross sectional view of a portion of a tape coated with a water blocking material according to the present invention.

FIG. 4 is a schematic view of a manufacturing line according to the present invention.

FIG. 5 is a cross sectional view of a fiber optic cable according the present invention.

FIG. 6 is a cross sectional view of a fiber optic cable according to the present invention.

FIG. 7 is an isometric view of a fiber optic cable according to the present invention.

FIG. 8 is a partial cross section of a fiber optic cable according to the present invention.

FIG. 9 is a partial cross section of a fiber optic cable according to the present invention.

DETAILED DESCRIPTION OF THE INVENTION

Referring to FIGS. 1–3, an exemplary fiber optic cable 10 according to a first embodiment of the present invention will be described. Fiber optic cable 10 includes a cable core 20, a jacket section 30, and may include a seam guard 40 as disclosed in U.S. Ser. No. 09/001,679, which is incorporated by reference herein. In a preferred embodiment of the present invention, jacket section 30 includes a cable component comprising a substrate, the substrate being a layer of tape 34 having a water blocking formulation 50 thereon. Water blocking formulation 50 preferably comprises a cross-linkable resin, for example, a radiation-curable resin, combined with a superabsorbent substance. In an embodiment of the present invention the radiation-curable resin comprises a light-curable resin.

As is best shown in FIG. 1, cable core 20 may include a dielectric central member 21 surrounded by a first set of buffer tubes 23. Buffer tubes 23 are, in turn, surrounded by a water-blocking tape 24, and each tube 23 includes respective optical fibers 22 therein. Optical fibers 22 may be embedded in a conventional water-blocking gel or grease. Cable core 20 may include a second set of buffer tubes 26 with respective optical fibers 25 therein which may be disposed in a water-blocking material.

Jacket section 30 includes a cable jacket 36, and a substrate in the form of a tape 34. Tape 34 may be of a sheet or a non-woven fabric type, and may be formed of a metallic material, e.g. steel, or a non-metallic material, e.g. plastic. Tape 34 is wrapped around core 20 whereby water blocking formulation 50 is effective to block the longitudinal migration of water in cable 10. In an embodiment of the present invention, tape 34 is a metallic tape that is mechanically robust enough to withstand attack by rodents and to resist the migration of moisture into the cable core. Tape 34 may include a seam 35 of the overlap type which is formed by a non-offset tape layer 39 and an offset tape layer 39 (FIG. 2). In a preferred embodiment, offset tape layer 38 is located radially outside of non-offset tape layer 39 with water blocking formulation 50 disposed therebetween whereby water blocking formulation 50 provides water blocking protection to seam 35. For additional sealing of seam 35, a seam guard 40 having a substrate in the form of a strip of polymeric tape is placed over seam 35 and against portions of tape layers 38,39. The polymeric tape of seam guard 40 may include water blocking formulation 50 thereon. Cable jacket 36 surrounds both tape 34 and seam guard 40 and may be formed of, for example, a polyethylene or a PVC material.

Alternatively, the invention may be practiced in the form of a fiber optic cable 10' (FIG. 8) whereby water blocking formulation 50 defines a seam guard without a polymeric tape. As further described below, water blocking formulation 50 may be a composite of non-compatible materials, e.g., a composite of a light curable resin and a liquid or a solid lubricant that is not compatible with the resin. The lubricant functions as a release agent that is effective, upon cable bending or twisting, to reduce the coefficient of friction between jacket 36 and tape 34, thereby de-coupling jacket 36 from tape 34 and inhibiting jacket zippering.

As is best shown in FIG. 3, water blocking formulation 50, is a combination of a light curable resin 52 and a water absorptive substance 54 that is bonded to a substrate, for example, tape 34. Light curable resin 52 is preferably a tough, abrasion resistant but flexible light curable resin, e.g. a urethane acrylate, that is advantageously adaptable to mass production processes. Resin 52 is preferably of the type which will undergo chemical cross-linking between molecules of the resin during curing. To enhance the mass production of formulation 50, light curable resin 52 includes a suitable initiator additive for fast processing speeds. As described in more detail below, preferably with the assistance of an initiator additive, resin 52 is substantially cured by energy radiated thereon.

Water blocking formulation 50 may be a composite. For example, to improve mechanical characteristics and/or processability of resin 52, water blocking formulation 50 may be a composite of a UV curable resin mixed with a non-compatible material. Suitable non-compatible materials comprise solid fillers, powders or fibers, particulates, and glass/polymeric micro-spheres. Additionally, resin 52 may be cellularized with a non-compatible foaming agent, e.g., a chemical or a mechanical foaming agent. Moreover, to reduce friction between water blocking formulation 50 and other cable components, resin 52 may include a non-compatible material in the form of a lubricant, e.g., a liquid lubricant such as a silicone or a wax which exudes to the surface, or a solid lubricant, e.g., Teflon.

Water absorptive substance 54 may include a single species of poly-sodium-acrylate polymer having a suitable gel strength, swell rate, and swell capacity. Alternatively, water absorptive substance 54 may be a mixture of two or more species of superabsorbent substances, as disclosed in co-pending U.S. Ser. No. 09/049,417 which is incorporated by reference herein. Additionally, water absorbent substance 54 may include an antifreeze substance that is effective to depress the freezing point of water. Anti-freeze substances are disclosed in U.S. Pat. No. 5,410,629, U.S. Pat. No. 5,321,788, and U.S. Pat. No. 4,401,366, which patents are incorporated by reference herein.

In an exemplary manufacturing line 100 according to the present invention, tape 34 is at least partially coated with water blocking formulation 50 (FIG. 4). Manufacturing line 100 is preferably a continuous type process and includes a tape payoff 105, a light curable resin application chamber 110, a water absorbent substance coating chamber 114 preferably having a substance recovery/recycling system (not shown), and a radiation chamber 118. Manufacturing line 100 further includes a conventional programmable logic controller (PLC) 130 and a length sensor 131. PLC 130 is operative to activate/deactivate chambers 110,118 in response to tape length information provided by length sensor 131. Light curable resin application chamber 110 may include a conventional coating type nozzle 112, and water absorbent substance coating chamber 114 may include a conventional powder coating type nozzle 116. Light curable resin 52, in a melted state, and water absorbent substance 54, in particulate form, are respectively supplied to nozzles 112,116 by conventional supply means (not shown) under suitable pressure and temperature conditions. A conventional fluidized bed apparatus (not shown) may be used as an alternative to powder coating nozzle 116. Suitable substance recovery systems are made available by the Nordson Corporation.

During the manufacturing operation (FIG. 4), tape 34 is fed from pay-off 105, and the length of the tape is monitored by sensor 131 which inputs the length information to PLC 130. When the tape length is substantially equal to a pre-programmed length value, PLC 130 activates nozzle 112 of light curable resin application chamber 110 whereby a bead of light curable resin 52, is applied to tape 34. Next, when the tape length information indicates the movement of tape 34 into coating chamber 118, PLC 130 activates water absorbent substance nozzle 116 whereby water absorptive substance 54 is propelled toward resin 52. The particles of water absorbent substance 54 are propelled onto light curable resin 52 so that they become at least partially embedded therein, thereby defining a liquid state water blocking formulation 50'. Next, tape 34 with water blocking formulation 50 is conveyed to radiation chamber 118. Alternatively, water absorbent substance 54 may be compounded with resin 52 and applied to tape 34 at the same time.

Radiation chamber 118 includes a radiation source 120 that emits light in an appropriate spectrum thereby effecting a rapid polymerization of resin 52. In other words, upon exposure to light energy emitted by radiation source 120, light curable resin 52 undergoes a rapid transition from a liquid state to a solid or a semi-solid state. As the transition occurs, the disposition of water absorptive substance 54 is generally fixed in and on resin 52. Rapid polymerization is advantageously enhanced by the initiator additive in resin 52 that is activated by complementary light energy radiated by radiation source 120. Where the initiator is a photoinitiator it functions by: absorbing energy radiated by radiation source 120; photo-cleaving, i.e., fragmenting, into reactive species; and then initiating a polymerization/hardening reaction of the monomers and oligomers in light curable resin 52. The result is a solid or a semi-solid network of cross-linking between the monomers, oligomers, and other additives in resin 52. In a preferred embodiment of the present invention, the photoinitiator has a characteristic photoactive region, i.e., a photoactive wavelength absorbency range, which exhibits peak photoactivity for inducing a maximum curing speed of light curable resin 52. In the preferred embodiment, the photoinitiator in light curable resin 52 is matched with a radiation source 120 that emits a high degree of energy within a range of frequencies that is complementary to the peak photoactive region of the photoinitiator, thereby assuring : the rapid curing of light curable resin 52. Commercially available photoinitiators that are suitable for use in light curable resin 52 include Irgacure products marketed by Ciba.

The photoinitiator in light curable resin 52 may have a photoactive region in the visible light wavelength range, or it may have a photoactive region in wavelengths which are shorter. For example, the photoinitiator in light curable resin 52 may have a photoactive region in the vacuum ultra-violet (VUV) (about 160–200 nm), ultra-violet (UV) (about 200–400 nm), visible light (V-light) (about 400–700 nm) wavelength range. Light curable resin 52, having a suitable photoinitiator, is preferably cured by being irradiated with a VUV, UV, V-light radiation source 120 that, as noted above, complements the peak photoactive absorbency range of the photoinitiator. In the case of an Infrared radiation curable resin, e.g. an elastomer, a suitable free-radical initiator can be used that is active upon being irradiated with an Infrared radiation source emitting wavelengths in the order of about visible light to about $1\times10^6$ nm.

Suitable radiation sources may be in the form of commercially available bulbs, for example, an H bulb having a standard mercury spectral line, or a D bulb (mercury vapor plus metal halide(s)). Alternatively, an excimer type bulb, for example, a Cobalt or a Xenon-chloride bulb, may be used as well. A conventional high intensity Infrared spectrum bulb, or an electrical resistance heater, can be used to cure the Infrared light curable resin.

After water blocking formulation 50 is cured, tape 34 may be reeled about a take-up reel (not shown). Alternatively, tape 34 may be sent directly to a corrugation machine, or a tape forming apparatus whereby the tape is wrapped about a cable core. Tape 34 may be formed into an overlap type seam 35 (FIG. 2) using an apparatus according to U.S. Pat. No. 4,151,365, U.S. Pat. No. 4,308,662, or U.S. Pat. No. 5,410,901, which patents are incorporated herein in their respective entireties. Alternatively, tape 34 may be formed into a butt type seam, for example, as taught in U.S. Pat. No. 3,785,048, which patent is incorporated by reference herein. Where water blocking formulation 50 defines a seam guard (FIG. 8), a bead of the formulation may be applied directly to the overlap or butt type joint and cured with a radiation source 120.

As an alternative to application of light curable resin 52 and water absorbent substance 54 described above, the light curable resin 52 and water absorbent substance 54 may be applied to the substrate in situ as a dry or a moist mixture of particulates, e.g., with a conventional electrostatic spray nozzle. The mixture can then be heated to the point of melting light curable resin 52 so that the resin, with the water absorbent substance therein and/or thereon, will bond to the substrate. The mixture may then be irradiated with a radiation source 118 to bring about the cross linking of resin 52, preferably to the degree that surface tackiness is avoided. Alternatively, a radiation source 118 can be used that will simultaneously emit Infrared radiation, to heat the resin, and shorter wavelength radiation, to photoactivate the cross-linking process.

The present invention may be practiced in the form of a cable 70 (FIG. 5) including a core having a cable component in the shape of a slotted rod 75 that is coated with water blocking formulation 50. Slotted rod 75 includes a central member 74, slots 73 having optical fiber ribbons 72 therein, and outer surfaces 79. Slotted rod 75 is associated with a jacket section 77. Slotted rod 75 is a substrate upon which water blocking formulation 50 is at least partially disposed, i.e., outer surfaces 79 and slots 73 may each include water blocking formulation 50 thereon whereby it surrounds at least part of the cable core, thereby potentially eliminating the necessity for a water blocking tape wrapped around slotted rod 75.

In the manufacture of slotted rod 75 according to the present invention, a slotted rod type extrusion die as disclosed in commonly assigned U.S. Ser. No. 617,710, which is incorporated herein by reference, may be adapted to co-extrude slotted rod 75 along with water blocking formulation 50. Water blocking formulation 50 is then cured with a radiation source 120. A co-extrusion process as described in commonly assigned U.S. Ser. No. 09/049,417, incorporated by reference hereinabove, may be used to apply water blocking formulation 50 to an extrudable substrate. Alternatively, water blocking formulation 50 may be topically applied on the slotted core 75 and then cured with a radiation source 120 (FIG. 4). Slotted rod 75 may be formed of, for example, a polypropylene copolymer, a polybutylene terephtalate, polyethylene, or a Nylon material.

The present invention may be practiced in the form of a composite cable 80 (FIG. 6) having a water blocking formulation 50. Composite cable 80 is capable of both optical and electrical/electronic signal transmission, and is generally made according to the teachings of commonly assigned U.S. Ser. No. 09/001,680 which is incorporated by reference herein. Composite cable 80 includes a core 82 having optical fibers 84, a strength section 85, a conductor and water blocking section 86 having cable components in the form of twisted pair electrical conductors 87, and a jacket section 89 having an armor tape 88. According to the present invention, water blocking formulation 50 is co-extruded with a substrate, for example, the insulation material of twisted pair conductors 87, and is then cured with a radiation source 120 in accordance with the present invention. Water blocking formulation 50 is associated with core and jacket sections 82,89 in that water blocking formulation 50 advantageously provides water blocking protection to interstices S defined therebetween. Alternatively, water blocking formulation 50 may be topically applied on the insulation of the twisted pair conductors 87 and then cured with a radiation source 120.

The present invention may be practiced in the form of a fiber optic cable 90 (FIG. 7) having a core with optical fiber ribbons 92 surrounded by a core tube 94. Strength members 96 are adjacent to core tube 94 and respective rip cords 98 are adjacent strength members 96 for facilitating removal of a jacket 99. Water blocking formulation 50 is applied to substrates comprising core tube 94, strength members 96, jacket 99, and/or rip cords 98 for water blocking protection.

The present invention may be practiced in the form of a fiber optic cable 100 (FIG. 9) having a loose tube type core with buffer tubes 103 having optical fiber ribbons therein. Water blocking formulation 50 is applied to a substrate in the form of a strengthening rod 104 for water blocking protection in the interstices between tubes 103 and jacket section 105. Strengthening rod 104 may be stranded with buffer tubes 103 in a loose tube cable manufacturing process, for example, as disclosed in U.S. Pat. No. 5,283,014, which patent is incorporated by reference herein. Fiber optic cable 100 may include water blocking formulation 50 applied directly to the cable core, in a process described in commonly assigned U.S. Ser. No. 09/048,486, incorporated by reference herein. Additionally, fiber optic cable 100 may include a tape 34 with water blocking formulation 50 as described hereinabove.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, the surfaces of cable components according to the present invention may be coated with water blocking formulation 50 as a stripe or intermittently as described in U.S. Ser. No. 09/048,486, incorporated by reference hereinabove. Additionally, any of the foregoing non-metallic substrates may be formed of a foamed plastic material.

Accordingly, what is claimed is:

1. A method of making a fiber optic cable with at least one optical fiber, comprising the steps of:
   (a) coating a substrate with a radiation curable resin;
   (b) creating a water blocking formulation by depositing a water absorptive substance on the radiation curable resin so that the water absorptive substance becomes at least partially embedded in the radiation curable resin;
   (c) irradiating the water blocking formulation with a radiation-emitting radiation source;
   (d) curing the water blocking formulation with the radiation-emitting radiation source; and
   (e) incorporating the substrate and the water blocking formulation in said fiber optic cable.

2. The method of claim 1, wherein the water blocking formulation is applied to the substrate as a mixture of particulates.

3. A method of making a fiber optic cable with at least one optical fiber, comprising the steps of:
   (a) creating a water blocking formulation comprising a radiation curable resin and a water absorptive substance compounded in the radiation curable resin;
   (b) coating a substrate with said water blocking formulation so that the water absorptive substance is at least partially embedded in the resin;
   (c) irradiating the water blocking formulation with a radiation-emitting radiation source;
   (d) curing the water blocking formulation with the radiation-emitting radiation source; and
   (e) incorporating the substrate and water blocking formulation in said fiber optic cable.

4. The method of claim 3, wherein the water blocking formulation is applied to the substrate as a mixture of particulates.

5. A fiber optic cable, comprising:
   at least one optical fiber;
   a cable jacket;
   a cable component associated with said cable jacket, said cable component including a water blocking formulation disposed on a substrate, said water blocking formulation comprising a radiation curable resin and an absorptive substance at least partially embedded therein.

6. The fiber optic cable of claim 5, wherein said radiation curable resin includes a photoinitiator that is photoactive in wavelengths at or below the visible wavelength range.

7. The fiber optic cable of claim 5, wherein said radiation curable resin includes a photoinitiator that is photoactive in wavelengths at or below the UV wavelength range.

8. The fiber optic cable of claim 5, wherein said radiation curable resin includes a photoinitiator that is photoactive in wavelengths in the vacuum UV wavelength range.

9. The fiber optic cable of claim 5, wherein said radiation curable resin includes an initiator that is active in wavelengths within the Infrared wavelength range.

10. The fiber optic cable of claim 5, wherein said absorptive substance is compounded in said radiation curable resin.

11. The fiber optic cable of claim 5, wherein said substrate is a tape disposed at least partially along said jacket section.

12. The fiber optic cable of claim 5, wherein said substrate is a slotted core surface adjacent said jacket section.

13. The fiber optic cable of claim 5, wherein said substrate is conductor insulation adjacent said jacket section.

14. The fiber optic cable of claim 5, wherein said substrate is a core tube.

15. The fiber optic cable of claim 5, wherein said substrate is the seam of a tape, said water blocking formulation comprising a seam guard over said seam.

16. The fiber optic cable of claim 5, wherein said substrate is a strength member.

17. The fiber optic cable of claim 5, wherein said substrate is a strengthening rod.

18. The fiber optic cable of claim 5, wherein said substrate is a rip cord.

19. The fiber optic cable of claim 5, wherein said substrate is a cable core.

20. A fiber optic cable, comprising:
   a cable core including at least one optical fiber;
   a cable component associated with said cable core, said cable component having a water blocking formulation disposed on a substrate, said water blocking formulation comprising a radiation curable resin and an absorptive substance therein.

21. The fiber optic cable of claim 20, wherein said radiation curable resin includes a photoinitiator that is photoactive in wavelengths at or below the visible wavelength range.

22. The fiber optic cable of claim 20, wherein said radiation curable resin includes a photoinitiator that is photoactive in wavelengths at or below the UV wavelength range.

23. The fiber optic cable of claim 20, wherein said radiation curable resin includes a photoinitiator that is photoactive in wavelengths in the vacuum UV wavelength range.

24. The fiber optic cable of claim 20, wherein said radiation curable resin includes an initiator that is active in response to being irradiated with radiation wavelengths within the infrared wavelength range.

25. The fiber optic cable of claim 20, wherein said absorptive substance is compounded in said radiation curable resin.

26. The fiber optic cable of claim 20, wherein said absorptive substance is at least partially embedded in said radiation curable resin.

27. The fiber optic cable of claim 20, wherein said substrate is a tape at least partially surrounding said core.

28. The fiber optic cable of claim 20, wherein said substrate is a slotted core.

29. The fiber optic cable of claim 20, wherein said substrate is conductor insulation adjacent said core.

30. The fiber optic cable of claim 20, wherein said substrate is a core tube.

31. The fiber optic cable of claim 20, wherein said substrate is the seam of a tape, said water blocking formulation comprising a seam guard over said seam.

32. A fiber optic cable, comprising:

at least one optical fiber;

a component disposed within said cable between a core and a jacket section of said cable, said component including a substrate with a composite water blocking formulation disposed thereon, said composite water blocking formulation comprising a radiation curable resin, a water absorptive substance at least partially embedded in the radiation curable resin, and a non-compatible material dispersed in said radiation curable resin.

33. The fiber optic cable of claim 32, wherein said non-compatible material is a lubricant for reducing friction.

34. The fiber optic cable of claim 33, wherein said lubricant is a liquid lubricant.

35. The fiber optic cable of claim 33, wherein said lubricant is a dry lubricant.

36. The fiber optic cable of claim 32, wherein said non-compatible material is selected from the group consisting of solid fillers, powders, fibers, particulates, and glass/polymeric micro-spheres.

37. The fiber optic cable of claim 33, wherein the lubricant functions as a release agent for reducing friction.

* * * * *